Jan. 8, 1924.

S. O. WHITE

MOUNTING FOR GEAR SHIFT LEVERS

Filed Aug. 11, 1922

1,480,323

INVENTOR
Samuel O. White,
BY
Arthur M. Hood.
ATTORNEY

Patented Jan. 8, 1924.

1,480,323

UNITED STATES PATENT OFFICE.

SAMUEL O. WHITE, OF MUNCIE, INDIANA, ASSIGNOR TO WARNER GEAR COMPANY, OF MUNCIE, INDIANA, A CORPORATION OF INDIANA.

MOUNTING FOR GEAR-SHIFT LEVERS.

Application filed August 11, 1922. Serial No. 581,127.

*To all whom it may concern:*

Be it known that I, SAMUEL O. WHITE, a citizen of the United States, residing at Muncie, in the county of Delaware and State of Indiana, have invented a new and useful Mounting for Gear-Shift Levers, of which the following is a specification.

The object of my invention is to produce a neat and efficient pedestal mounting for gear shift levers of such character that the shifting lever may be readily locked against gear shifting manipulation by means of such character that stresses applied to the lever can not be transmitted to the key-controlled portion of the lock.

A further object of my invention is to produce, within the cost limits permissible for this portion of an automobile, a structure which can not be readily thrown out of commission by unauthorized persons.

Figure 1:
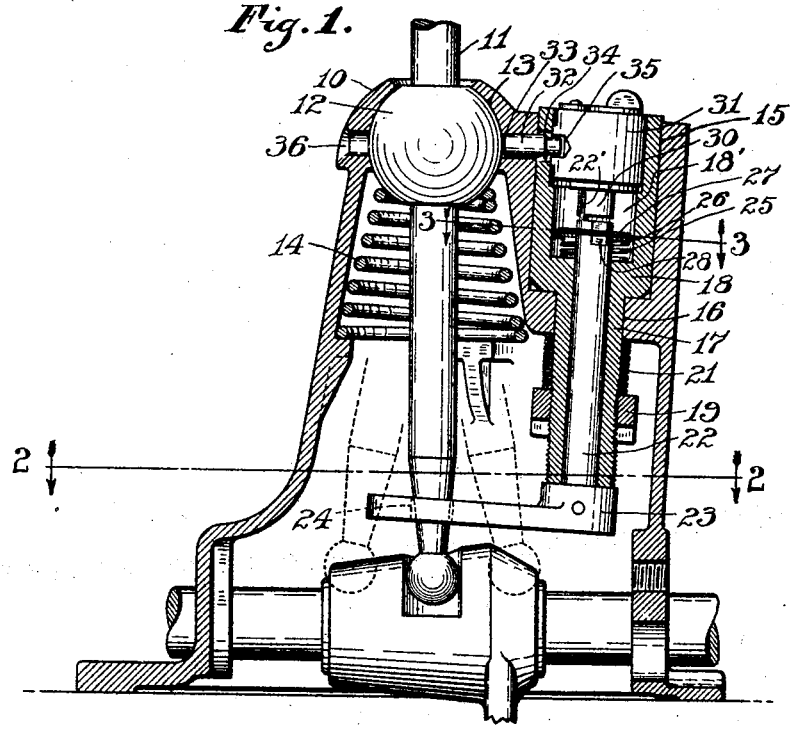
Figure 2:
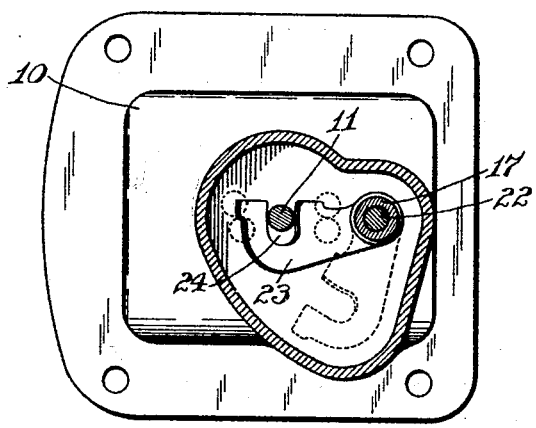
Figure 3:
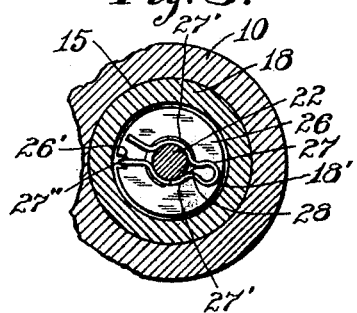

The accompanying drawings illustrate my invention. Fig. 1 is a central, vertical section of my improved pedestal with a fragment of the gear shift lever; Fig. 2, a section on line 2—2 of Fig. 1 and Fig. 3, a section on line 3—3 of Fig. 1.

In the drawings, 10 indicates the main pedestal casting which is a hollow structure within which the shifting lever 11 is mounted. It will be readily understood that the precise character of the mounting of the shifting lever in the pedestal is not material so long as that mounting is of such character that the lever is capable of movement in one direction in bringing it into association with desired portions of the gear shifting mechanism and, when so shifted, may be moved in another direction to shift the gear mechanism. The precise manner in which the shifting lever is associated with the gear shifting mechanism and the precise character of the gear shifting mechanism is immaterial to my present invention.

In the present instance, the gear shifting lever 11 is provided with an intermediate spherical portion 12 which is seated in a semi-spherical pocket 13 in the upper end of pedestal 10 and held in place by spring 14, being shiftable laterally, from the middle neutral position indicated in full lines, and then to any one of the gear shifting positions indicated in dotted lines.

Alongside of the lower end of lever 11 (conveniently at a slight vertical angle thereto, though not necessarily), is a cylindrical pocket 15 having a perforation 16 in its floor. Projected through perforation 16 is the shank 17 of a shell 18 which is fitted within pocket 15, shell 18 and stem 17 being of a hardened or toughened material which can not be cut by hack saws and other ordinary implements commonly in the possession of thieves.

The lower end of stem 17 is externally threaded to receive nut 19, and a coil spring 21, of opposite pitch, is arranged between nut 19 and the underside of the floor of pocket 15. Spring 21 is preferably formed of a wire having a rectangular cross section and is so proportioned that nut 19 may be driven up along shank 17 far enough to compact the spring.

Shank 17 is bored to receive a rock shaft 22 to the lower end of which is secured a locking fork 23, said fork being provided in one side with an arc-shaped slot 24 for the reception of the lower end of lever 11.

The upper end of shell 18 is bored out, as indicated at 18', to a point well below the upper end of shaft 22 and the shaft is held in vertical position by spring 25 seated in the lower end of bore 18' and acting upon a washer 26 held upon shaft 22 by spring clip 27. Near its upper end shaft 22 is flattened at 28 and washer 26 is correspondingly bored so that it will not rotate upon shaft 22. Clip 27 is conveniently formed of a single piece of wire doubled upon itself and its legs distorted, as indicated at 27', so as to embrace the upper end of shaft 22. One leg of the clip 27 is provided with a downturned tip 27'' formed to enter a notch 26' in the edge of washer 26 so as to be held against rotation. Shaft 22, at an appropriate point, will be slightly circumferentially grooved to receive the clip 27.

The upper end of shaft 22 is formed into a diametrical tongue 22', which will be received in a corresponding notch formed in the lower end of the rotatable stem 30 of the key-controlled lock, said lock having a main body 31 seated in the upper end of shell 18 and preferably flush with its upper end. Body 31 will be held against rotation in shell 18 by means of the pin 32 lying in a passage 33 formed in pedestal 10 and projected through a suitable perforation 34 in shell 18 and into a recess 35 in the side of body 31. Passage 33 will be accessible for the insertion or withdrawal of pin 32, when lever 11 is withdrawn, through an opening 36 in the pedestal. Pin 32 will be held against accidental displacement by ball 12 of lever 11.

The lock 30, 31 will be of a well-known form where, upon the insertion of a key, suitable tumblers carried by the rotatable element 30 will cooperate with suitable tumblers carried by body 31, to permit rotation of stem 30, body 31 being provided with two sets of cooperating tumblers, one at each limit of oscillation of stem 30 so that, upon withdrawal of the key, the stem 30 will be held by the tumblers against rotative movement. The key-controlled mechanism just referred to is well-known and, therefore, needs no detailed illustration.

Spring 21 serves to hold shell 18 in place against rattling and spring 25 performs the same function for shaft 22 and its associated parts. It will be seen, therefore, that the parts may be manufactured and assembled cheaply, yet without danger of producing a noisy construction.

When, through the medium of a suitable key, stem 30 is rotated to bring fork 23 to the position shown in full lines in Fig. 2, the lower end of lever 11 will lie within notch 24 and will, therefore, be held against lateral movement necessary to permit it to be moved from neutral to either one of its gear shifting positions. As is common in mechanisms of this kind, lever 11 is, when in neutral, held against movement in gear shifting directions.

It will be noted that the only force which can be applied through lever 11 to fork 23 is one at right angles to the axis of shaft 22 and that consequently no force can be applied through the medium of lever 11 which would tend to subject the mechanism which is directly key-controlled to any twisting or injurious force.

By reason of the hardened or toughened shell 18, the locking mechanism is thoroughly protected against theft although the pedestal may be of comparatively soft material such as aluminum.

I claim as my invention:

1. A gear shift lever lock comprising a pedestal, a shifting lever mounted therein, a locking fork formed for separable interlocking engagement with the shifting lever, a shaft carrying said fork and journalled in the pedestal, a key-controlled lock pocketed in the pedestal in cooperative relation with said shaft and having a non-rotative engagement with said shaft, and a spring acting upon the shaft to hold the same axially in position in the pedestal.

2. A gear shift lever lock comprising a pedestal, a shifting lever mounted therein, a locking fork formed for separable interlocking engagement with the shifting lever, a shaft carrying said fork and journalled in the pedestal, means for holding said shaft in axial position, a key-controlled lock pocketed in the pedestal in cooperative relation to said shaft and having a non-rotative engagement with said shaft, and a retaining pin projected through the pedestal and into the body of the key-controlled lock to prevent rotation thereof, the removal of said retaining pin being blocked by the shifting lever.

3. A gear shift lever lock comprising a pedestal, a shifting lever mounted therein, a locking fork formed for separable interlocking engagement with the shifting lever, a shaft carrying said fork and journalled in the pedestal, a key-controlled lock pocketed in the pedestal in cooperative relation with said shaft and having a non-rotative engagement with said shaft, a spring surrounding the upper end of said shaft under compression between the pedestal and a member carried by the shaft and acting to hold said shaft axially upwardly, for the purpose set forth.

4. A gear shift lever lock comprising a pedestal, a shifting lever mounted therein, a protective shell mounted in a pocket in said pedestal having a portion projected through the bottom of said pocket, means comprising a spring for retaining said shell in axial position in the pedestal, a shaft journalled in said shell, means comprising a compression spring for retaining said shaft in axial position in the shell, a key-controlled lock mounted in the shell and provided with a rotative key-controlled member having a non-rotative engagement with the shaft, and a locking fork carried by the shaft within the pedestal and formed for separable interlocking engagement with the shifting lever.

5. A gear shift lever lock comprising a pedestal, a shifting lever mounted therein, a protective shell mounted in a pocket in said pedestal having a portion projected through the bottom of said pocket, means comprising a spring for retaining said shell in axial position in the pedestal, a shaft journalled in said shell, means for retaining said shaft in axial position in the shell, a key-controlled lock mounted in the shell and provided with a rotative key-controlled member having a non-rotative engagement with the shaft, and a locking fork carried by the shaft within the pedestal and formed for separable interlocking engagement with tht shifting lever.

6. A gear shift lever lock comprising a pedestal, a shifting lever mounted therein, a protective shell mounted in a pocket in said pedestal having a portion projected through the bottom of said pocket, means for retaining said shell in axial position in the pedestal, a shaft journalled in said shell, means comprising a compression spring for retaining said shaft in axial position in the shell, a key-controlled lock mounted in the shell and provided with a rotative key-controlled member having a non-rotative engagement with the shaft, and a locking fork carried by the shaft within the pedestal and formed for separable interlocking engagement with the shifting lever.

7. A gear shift lever lock comprising a pedestal, a shifting lever mounted therein, a protective shell mounted in a pocket in said pedestal having a portion projected through the bottom of said pocket, means for retaining said shell in axial position in the pedestal, a shaft journaled in said shell, means for retaining said shaft in axial position in the shell, a key-controlled lock mounted in the shell and provided with a rotative key-controlled member having a non-rotative engagement with the shaft, and a locking fork carried by the shaft within the pedestal and formed for separable interlocking engagement with the shifting lever.

8. A gear shift lever lock comprising a pedestal, a shifting lever mounted therein, a protective shell mounted in a pocket in said pedestal having a portion projected through the bottom of said pocket, means comprising a spring for retaining said shell in axial position in the pedestal, a shaft journaled in said shell, means comprising a compression spring for retaining said shaft in axial position in the shell, a key-controlled lock mounted in the shell and provided with a rotative key-controlled member having a non-rotative engagement with the shaft, and a locking fork carried by the shaft within the pedestal and formed for separable interlocking engagement with the shifting lever, and a retaining pin mounted in the pedestal and projected into engagement with the shell and main body of the key-controlled lock to prevent movement of said parts, said retaining pin being blocked from removal by the shifting lever.

9. A gear shift lever lock comprising a pedestal, a shifting lever mounted therein, a protective shell mounted in a pocket in said pedestal having a portion projected through the bottom of said pocket, means comprising a spring for retaining said shell in axial position in the pedestal, a shaft journaled in said shell, means for retaining said shaft in axial position in the shell, a key-controlled lock mounted in the shell and provided with a rotative key-controlled member having a non-rotative engagement with the shaft, and a locking fork carried by the shaft within the pedestal and formed for separable interlocking engagement with the shifting lever, and a retaining pin mounted in the pedestal and projected into engagement with the shell and main body of the key controlled lock to prevent movement of said parts, said retaining pin being blocked from removal by the shifting lever.

10. A gear shift lever lock comprising a pedestal, a shifting lever mounted therein, a protective shell mounted in a pocket in said pedestal having a portion projected through the bottom of said pocket, means for retaining said shell in axial position in the pedestal, a shaft journaled in said shell, means comprising a compression spring for retaining said shaft in axial position in the shell, a key-controlled lock mounted in the shell and provided with a rotative key-controlled member having a non-rotative engagement with the shaft, and a locking fork carried by the shaft within the pedestal and formed for separable interlocking engagement with the shifting lever, and a retaining pin mounted in the pedestal and projected into engagement with the shell and main body of the key-controlled lock to prevent movement of said parts, said retaining pin being blocked from removal by the shifting lever.

11. A gear shift lever lock comprising a pedestal, a shifting lever mounted therein, a protective shell mounted in a pocket in said pedestal having a portion projected through the bottom of said pocket, means for retaining said shell in axial position in the pedestal, a shaft journaled in said shell, means for retaining said shaft in axial position in the shell, a key-controlled lock mounted in the shell and provided with a rotative key-controlled member having a non-rotative engagement with the shaft, and a locking fork carried by the shaft within the pedestal and formed for separable interlocking engagement with the shifting lever, and a retaining pin mounted in the pedestal and projected into engagement with the shell and main body of the key-controlled lock to prevent movement of said parts, said retaining pin being blocked from removal by the shifting lever.

12. A gear shift lever lock comprising a pedestal, a shifting lever mounted therein, a locking fork formed for separable interlocking engagement with the shifting lever, a shaft carrying said fork and journaled in the pedestal, a key-controlled lock pocketed in the pedestal in cooperative relation with said shaft and having a non-rotative engagement with said shaft, and a retaining pin projected through the pedestal and into the body of the key-controlled lock to prevent rotation thereof, the removal of said retaining pin being blocked by the shifting lever.

13. A gear shift lever lock comprising a pedestal, a shifting lever mounted therein, a protective shell mounted in a pocket in said pedestal, a shaft journaled in said shell, a key-controlled lock mounted in the shell and provided with a rotative key-controlled member having a non-rotative engagement with the shaft, a locking fork carried by the shaft within the pedestal and formed for separable interlocking engagement with the shifting lever, and a retaining pin mounted in the pedestal and projecting into engagement with the shell and main body of the key-controlled lock to prevent movement of said parts, said retaining pin being blocked from removal by the shifting lever.

In witness whereof, I have hereunto set my hand at Muncie, Indiana, this eighth day of August, A. D. one thousand nine hundred and twenty two.

SAMUEL O. WHITE.